May 24, 1938.  F. G. GOODE ET AL  2,118,079
APPARATUS FOR MILEAGE TESTING
Filed Nov. 2, 1936  3 Sheets-Sheet 1
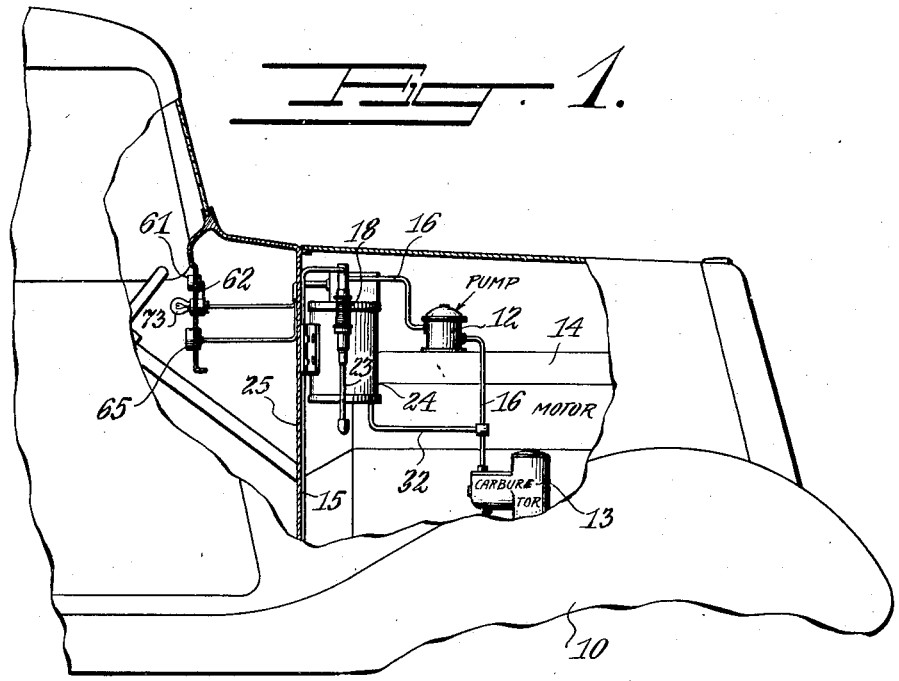
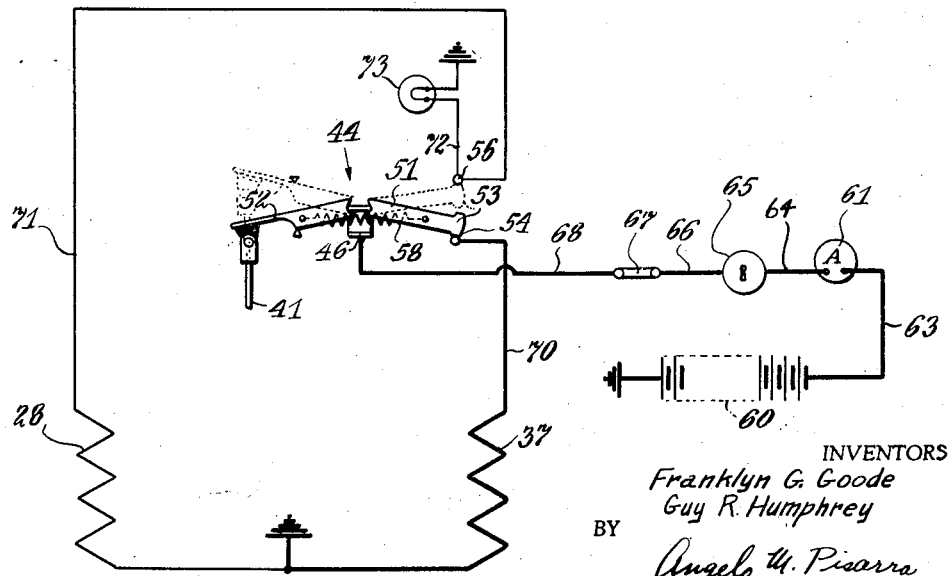
INVENTORS
Franklyn G. Goode
Guy R. Humphrey
BY
Angelo U. Pisarra
ATTORNEY.

May 24, 1938.  F. G. GOODE ET AL  2,118,079
APPARATUS FOR MILEAGE TESTING
Filed Nov. 2, 1936  3 Sheets-Sheet 2
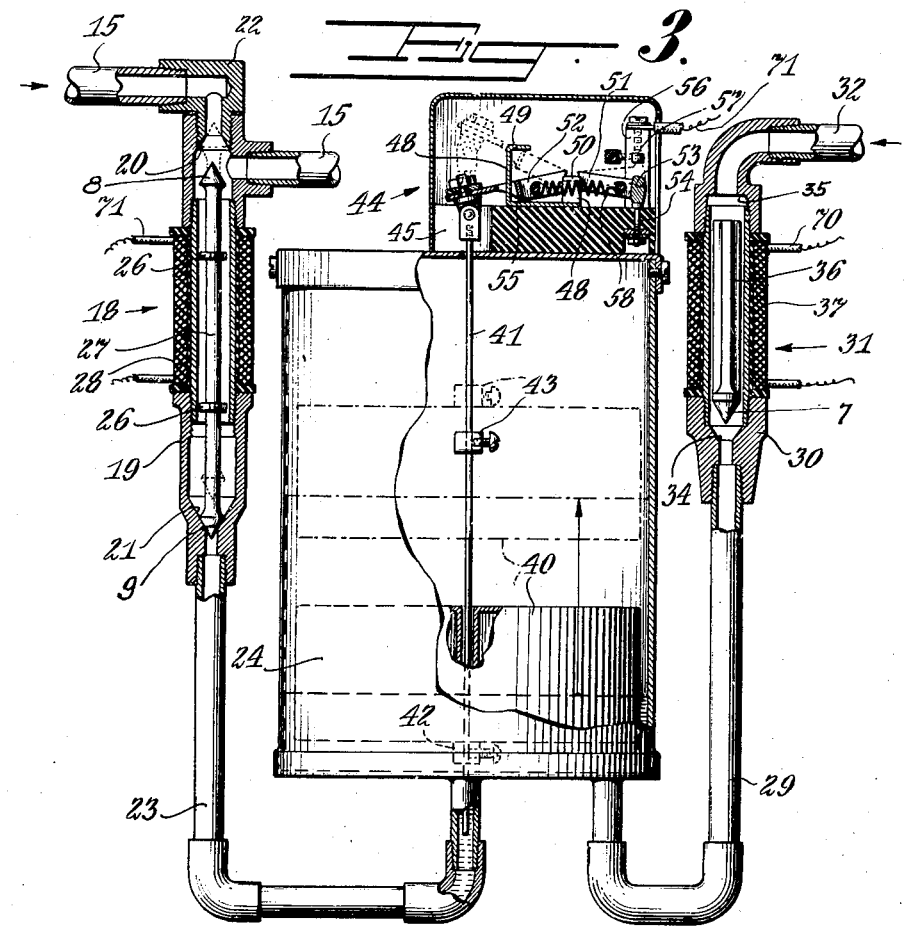
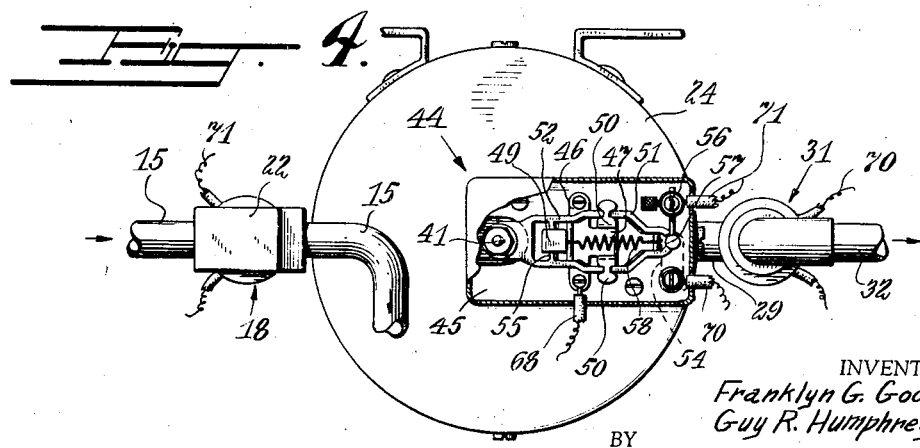
INVENTORS
Franklyn G. Goode
Guy R. Humphrey
BY
Angelo M. Pisarra
ATTORNEY.

May 24, 1938.  F. G. GOODE ET AL  2,118,079
APPARATUS FOR MILEAGE TESTING
Filed Nov. 2, 1936  3 Sheets-Sheet 3
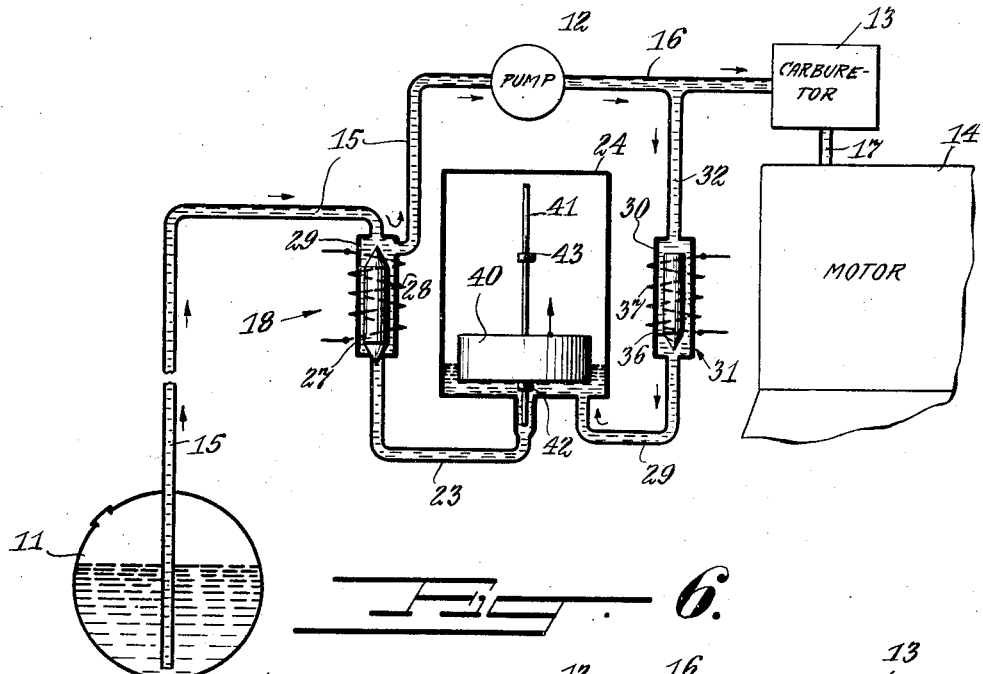
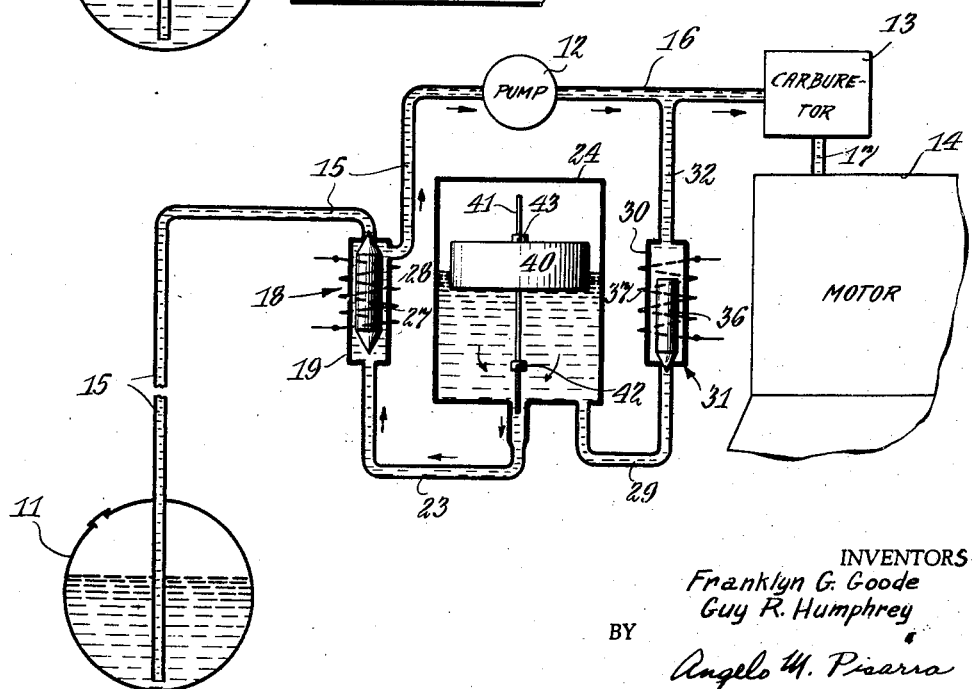
INVENTORS
Franklyn G. Goode
Guy R. Humphrey
BY
Angelo M. Pisarra
ATTORNEY.

Patented May 24, 1938

2,118,079

UNITED STATES PATENT OFFICE 2,118,079

APPARATUS FOR MILEAGE TESTING

Franklyn G. Goode, Eatontown, and Guy R. Humphrey, Somerville, N. J.

Application November 2, 1936, Serial No. 108,894

6 Claims. (Cl. 73—51)

This invention relates to a novel apparatus for measuring the mileage of a motor actuated vehicle per unit of fuel consumed. In its specific aspect the invention is directed to a novel apparatus for determining the mileage of an internal combustion motor actuated vehicle, as for example an automobile, per unit of fuel, as for example gasoline consumed.

Another object of the invention is to provide a novel apparatus for measuring the mileage of a motor actuated vehicle per unit of fuel consumed.

Another object of the invention is to provide a novel mechanism which is relatively inexpensive and may be readily mounted in an automobile and readily properly connected and which need not be disconnected so that the engine may run even when said mechanism is not to be used for measuring.

These and other objects of the invention will be readily apparent from the following description and drawings, wherein Figure 1 represents a fragmentary view of an automobile including the invention.

Figure 2 represents a wiring diagram of the circuits employed in the invention.

Figure 3 represents an elevational view with some of the parts broken away and other parts in cross section of the measuring tank and its associated parts.

Figure 4 is a top plan view of the structure shown in Figure 3.

Figure 5 is a diagrammatic view of a part of the invention and illustrates the positions of the valves at one stage and the direction of fuel flow when the valves are in said position.

Figure 6 is a diagrammatic view similar to Figure 5 and illustrates the positions of the valves at another stage and the direction of fuel flow when the valves are in said positions.

As shown in the drawings, an automobile 10 comprises a gasoline supply tank 11, a pump 12, a carburetor 13, an internal combustion engine 14 for driving the automobile, with said elements respectively connected to each other by pipe lines 15, 16, 17.

According to the invention a fluid direction control 18 is connected to the pipe line in a position between the fuel tank 11 and the pump 12. The fluid direction control 18 comprises a hollow cylinder or chamber 19 of brass or other non-magnetic material open at each end and having a seat 20 at its upper end and a seat 21 at its lower end. That portion of the pipe line 15 which has one end located in the fuel tank 11 has its other end connected to the upper end of the cylinder 19 by an elbow 22 to provide a fluid passageway from said tank 11 to said cylinder 19. And, that portion of the pipe line 15 which has one end connected to said pump 12 has its other end connected to said cylinder 19 and in registry with an opening in the side of said cylinder, which opening is located near the upper end of said cylinder, and below the seat 20. A pipe line 23 has one end in registry with the opening in the lower part of cylinder 19 and is connected to said cylinder and its other end is secured to the bottom of a test tank 24 and is in registry with an opening in the bottom thereof. The test tank may be of any convenient size and may be mounted on a dividing panel 25 which separates the driver from the motor 14.

Located in said chamber 19 are a pair of conical valves 8 and 9 carried by a cylindrical stem 27 composed of a magnetic material such as cast iron. The valves 8 and 9 are adapted to be located in the seats 20 and 21 to prevent the passage of fluid through the openings at the ends of the cylinder 19. Mounted on said stem 27 are perforated or fluted guides 26 to maintain said member 27 erect at all times. A winding or solenoid 28 is concentric with said cylinder 19.

In operation when the solenoid 28 is de-energized (as shown in Figure 5) the stem 27 because of the force due to gravity is located in its lowermost position and the valve 9 is located on the seat 21 to completely close the opening thereof and to prevent the passage of fluid through the lower end of the chamber 19. When said stem is in this position the valve 8 is disposed an appreciable distance from seat 20 so that fluid may freely pass into cylinder 19 from the fuel tank and through said cylinder 19 to the pump 12.

When the solenoid 28 is energized (as shown in Figure 6) the stem 27 is raised against the force due to gravity and the valve 8 is located in the upper seat 20 and completely closes the upper passageway of cylinder 19 to prevent the admission of fluid from the tank 11 to cylinder 19. While in this position the valve 9 is disposed an appreciable distance from seat 21 and fluid may pass into said cylinder 19 through the opening in the bottom thereof.

In either case whether the stem 27 is in its lowermost position to prevent the passage of fluid into or out of the cylinder 19 through the lowermost opening thereof or when it is held in its uppermost position to prevent the passage of fluid either into or out of the cylinder 19 through the uppermost opening thereof, fluid may pass through the opening in the side of said cylinder 19.

Connected to another opening in the bottom of said test tank 24 and in registry therewith is one end of a pipe line 29 whose other end is in registry with an opening in the lower part of hollow brass or other non-magnetic cylinder 30 of a fluid direction control 31. The hollow cylinder or chamber 30 has an opening in its upper end to which is connected one end of a pipe line 32 and the upper end of said pipe line 32 makes a T-connection with the pipe line 16 at a point between the pump 12 and carburetor 13.

The fluid direction control 31 includes a lower seat 34 and a soft iron magnetic stem 36 whose lower end terminates in a conical valve 7. The stem 36 is fluted or grooved along the length thereof. The grooves or channels of the fluted section of the stem 36 are of such depth that the distance between the inside of any two diametrically disposed channels is materially less than the upper opening at the seat 35 while the outside diameter of the stem 36 is materially greater than the diameter of the upper opening which is in seat 35. A winding or solenoid 37 is concentric with said chamber 30.

In operation when the solenoid 37 is de-energized, because of the force due to gravity the member 36 is located in its lowermost position (Figure 6) and valve 7 rests in seat 34 and prevents the passage of fluid either into or out of said cylinder 30 through the lower opening in said cylinder. While in this position the upper end of the stem 36 is spaced from the opening in the upper part of the cylinder 30 and fluid may pass into said cylinder through said opening.

When the solenoid 37 is energized the stem 36 is raised against the force due to gravity and may attain the position shown in Figure 5, or its upper end may rest against seat 35. The stem 36 has an overall diameter less than the inside diameter of the cylinder 30, so that no matter what the position of stem 36 as long as valve 7 is spaced from the lower seat 34, fluid may pass into or out of said cylinder and through said cylinder.

Located in said closed tank is an hermetically sealed hollow metallic float 40, having a guide passageway through the center thereof. Said float 40 is slidably mounted on a rod 41 passing trough the upper end of said tank and through the passageway in said float. A pair of adjustable stop members 42 and 43 are mounted on said rod, with one of these stops being on each side of said float. By adjusting the distance between the stops 42 and 43, it is possible to regulate or determine the quantity of fluid which must be fed to said tank to cause said rod 41 to be actuated by said float.

An instantaneous snap switch 44 is mounted on the top of said tank and includes an insulator base 45 on whose upper face is secured a conductor 46 having a flat portion 47 resting on said upper face. One end of said conductor 46 has a vertically extending portion 48 which terminates in an inwardly projecting stop flange 49. The other end of the conductor has vertically extending narrow side portions terminating in oppositely directed outwardly extending ears 50, having portions of reduced widths to accommodate the grooved inner end of movable elements 51 and 52.

Element 51 is in the form of a yoke having sides whose ends are grooved to accommodate the reduced portions of ears 50 about which it may rotate and whose cross bar 53 when in its lowermost position (Figure 3) makes contact with the electrical contact 54 secured to said insulator and electrically insulated from conductor 46.

Element 52 is a yoke corresponding generally to yoke 51 and has sides whose ends are grooved to accommodate the reduced portions of ears 50, about which it may rotate and whose cross bar 55 limits the extent of upward and downward movement of the yoke by virtue of the stop flange 49 and the flat portion 47 of the conductor 46. Extending beyond said cross bar 55 is an enlarged ear to which may be mounted the rod 41 for universal movement by means of a ball and socket connected or for pivotal movement by the pivot connection as shown. The rod may be electrically insulated from said ear by appropriate and well known insulators at the point of connection.

A post 56 having a stop conductor contact 57 electrically connected thereto is secured to said insulator 45 and insulated from all the conductors except contact 57 when elements 51 and 52 are in their lowermost position.

A sturdy coil spring 58 has one end connected to the yoke 51 and its other end to yoke 52 and tends to pull said yokes towards each other.

In operation with the spring as shown in Figure 3 the yokes 51 and 52 are maintained in their lowermost positions. When the fluid in the test tank 24 reaches a predetermined height, the force due to the weight of the fluid displaced by the float acts upon the enlarged portion of yoke 52 and causes the yoke 52 to rotate about the ears 50 and when the cross bar of the yoke member reaches a predetermined height, the spring 58 causes the both yokes 51 and 52 to snap to their uppermost position shown in Figure 2.

When the fluid recedes the float moves downwardly and the yoke 52 rotates counterclockwise and when a sufficient force has been applied to yoke 52 by the float when it reaches a predetermined lower level, the spring causes instantaneous snapping of yokes 51 and 52 to their lowermost positions. Thus the upper and lower levels at which the switch is snapped determines the quantity of gas to be used in a test and these levels may be controlled by the position of stops 42 and 43.

In order to ascertain when the liquid in the test tank reaches the uppermost and lowermost test levels, there is provided a signal circuit which is an electric circuit comprising a source of direct current 60 with one terminal of said source connected to ground and the other terminal to one terminal of an ammeter 61 on the dash board 62 of the automobile by conductor 63. Conductor 64 is electrically connected to the other terminal of the ammeter 61 and to one terminal of an ignition lock switch 65 mounted on said dash board. Conductor 66 is electrically connected to the other terminal of ignition switch 65 and to one terminal of a single throw switch 67. A conductor 68 is connected to the other terminal of switch 67 and to conductor 46. A conductor 70 is connected to one end of the solenoid 37 and to the contact 54. The other end of the solenoid 37 is connected to ground. A conductor 71 is connected to one end of the solenoid 28 and to the post 56. Conductor 72 is connected to post 56 and to one terminal of a signal indicator such as a bell or an incandescent lamp 73 and the other terminal of said lamp is connected to ground as is the other terminal of solenoid 28.

In the operation of the automobile and with the ignition switch "on" and with the switch 67 "off", fuel is fed from the tank 11 through a part of the pipe line 15 to the chamber 19 through the opening in its upper end. With the switch 67 in "off" position valves 9 and 7 are in their lowermost positions and close the respective openings 21 and 34 so that no liquid may pass therethrough. The fuel entering chamber 19 passes therefrom through the opening in the side of said chamber to and through the other part of line 15 to the pump 12 which causes flow of the fuel. From the pump 12 the fuel is forced along the line 16 to the carburetor which controls the amount of fuel that is to flow therefrom through the pipe line 17 to the motor 14.

Assuming that the float 40 is in its lowermost position as shown and that the stops 42 and 43 are so spaced on rod 41 that one tenth of a gallon of additional fuel is to be the test quantity of fuel. In order to determine the mileage run of an automobile at any particular speed as for example 30 miles per hour, the switch 67 may be "off" until this speed has been attained. When the automobile has attained this speed, which may be readily ascertained from a speedometer on the dashboard 62, the switch 67 is moved to "on" position. When this is done a circuit is made and consists of the series connection of battery 60, conductor 63, ammeter 61, conductor 64, ignition switch 65, conductor 66, switch 67, conductor 68, plate 46, yoke 51, contact 54, conductor 70, solenoid 37 to ground. When said circuit is made the solenoid 28 is inoperative or "dead." Thus the stem 27 is in its lowermost position because of the force thereon due to gravity and the valve 9 is located in the seat 21 to prevent the passage of fluid through the lower opening in the chamber 19.

Upon "making" of said circuit the solenoid or winding 37 is energized and the stem 36 and the valve 7 are pulled upwardly so that the valve is spaced from the seat 34 as shown in Figure 5. The pump 12 now as shown in Figure 5 causes the fuel to be moved in the direction of the arrows as shown. From the fuel tank 11, the fuel flows through part of the line 15 into the chamber 19 through the opening in the upper end thereof, then through the opening in the side of said chamber 19 into and through the other part of line 15, with no fluid passing through the lower opening in chamber 19 because of the location of valve 9. Then the fuel flows to the pump 12 and from the pump through the pipe line 16. From the pipe line 16 the quantity of fuel required by the carburetor is fed thereto and the excess fuel in line 16 flows through the pipe line 32 into the chamber 30 through an opening at its upper end. Fuel passes into chamber 30 and through the opening in the bottom thereof and then through the pipe line 29 into the test tank 24 through an opening in its bottom. Thus fuel is fed to the motor 14 while a portion thereof flows into the test tank 24. The fuel continues to flow in the direction of the arrows shown in Figure 5 until a predetermined and as for example one tenth of a gallon of additional fuel has flowed into tank 24. As the height of the fuel in said tank increases height of the float increases as it slides along the rod 41. When the one tenth of a gallon of fuel has been added to the test tank 24, the float pushes against the lug 43 on rod 41 to cause such actuation of said rod to rotate the yoke 52 of the snap switch to such a position that there is an instantaneous snap or trigger action of both yokes 51 and 52 so that they both assume the dotted line positions shown in Figure 2.

At this stage the before mentioned circuit is "broken", the solenoid or winding 37 is "dead" and a new circuit is made consisting of the series connection of the batteries 60, conductor 63, ammeter 61, conductor 64, ignition switch 65, conductor 66, switch 67, conductor 68, plate 46, conductor post 56, conductor 71, solenoid or winding 28 and ground; and in parallel with said solenoid or winding 28 is an incandescent lamp 73 connected to ground and to the post 56 by a conductor 72.

Thus when the last mentioned circuit is established the winding 28 is energized and the lamp filament is incandesced or the lamp is visibly energized or lighted.

As soon as the lamp is energized the reading on the speedometer is noted and should be the test speed 30 miles per hour, and the reading of the odometer should be noted for future reference. All the operator need do now is to maintain the speedometer reading as constant as he can.

As soon as the last mentioned circuit is made and during the entire period it is so made, the fuel is fed to the motor in the manner shown in Figure 6. As shown, the valve stem 36 is in its lowermost position because of the force due to gravity and the valve 7 is located in seat 34 to prevent the flow of fuel through the opening in the lower part of chamber 30. The winding 28 is energized and the valve stem 27 is raised so that the valve 8 is located in seat 20 to prevent the flow of fuel through the opening in the uppermost part of chamber 19. The fuel now flows from the test tank 24 through the pipe 23 into the chamber 19 and from the chamber through its side opening through a portion of pipe line 15 through the pump 12, through line 16 to the carburetor, and from there to the motor 14 via pipe line 17.

Thus all of the fuel now is fed to the motor from the test tank 24 only. The flow or feed is so maintained, with the height of the fuel in tank 24 receding and the float 40 sliding downwardly on the rod 41 until it is stopped by lug 42 and when the force on lug 42 reaches a predetermined value—and this occurs when one tenth of a gallon of fuel has flowed out of the test tank 24 and one tenth of a gallon of fuel has been fed to motor 14—the rod 41 is moved downwardly to actuate the instantaneous snap or trigger switch. When so actuated the yokes 51 and 52 move from the dotted line position to the full line position shown in Figure 2. At this stage the first defined circuit is made and the lamp is de-energized. So, the operator aware of the de-energization of the lamp filament notes the reading of the odometer. The original reading of the odometer taken when the lamp filament was first energized—which is the moment the fuel was being fed from the test tank alone and the fuel tank 11 was taken out of the line—is subtracted from the next odometer reading when the lamp filament was de-energized. This result apprises the operator of the mileage of the automobile at the particular speed of travel and in this example 30 miles per hour.

The above operations may be carried out over and over again in the sequence above defined. Although the automobile may be operated with the switch 67 always in closed position, it may be preferable to conserve the additional elements of the present invention when no fuel testing is desired. This may be done by merely "opening" the switch 67. In the invention as shown, it is preferable that the switch 67 be in series with the ignition switch.

Thus it is apparent that the novel invention is of simple and inexpensive construction and parts, with few moving elements which may be permanently secured to the normal fuel line and there maintained during the entire use of the automobile without its being normally seen or lessening the automobile efficiency while providing a tester which may be connected for operation by a mere electrical switch operation and thus also rendered inoperative.

Although the invention has been described in some detail, it is to be limited only by the prior art.

What is claimed:

1. In a fuel feed system for a motor, said system including a fuel tank and a feed pump, the combination of a measuring chamber, fuel conducting means connected to said chamber and the inlet side of said pump, a valve for controlling the flow of fuel into said chamber, fuel conducting means connected to said chamber and to the outlet side of said pump, a valve for controlling the flow of fuel out of said chamber, a valve for controlling the flow of fuel from said tank to said pump, means for operating said valves, said last means including a float in said chamber, a source of electric energy and solenoid windings.

2. In a fuel feed system for a motor, said system including a fuel tank and a feed pump, the combination of a measuring chamber, fuel conducting means connected to the inlet and outlet sides of said pump and to said chamber, valves at the inlet and outlet sides of said pump to control the fuel fed into and from said chamber, another valve, said last valve being at the outlet side of said tank to control the flow of fuel from said tank to said pump, means for operating said valves, said last means including a source of electric energy, a plurality of solenoid windings, a switch, a float in said chamber for operating said switch and an indicator.

3. In a fuel feed system for a motor, said system including a fuel tank and means for conveying fuel from said tank to said motor, the combination of a measuring chamber, means for conveying to said chamber a portion of the fuel conveyed by said first mentioned means towards said motor while the remainder conveyed by said first mentioned means is fed to said motor for the operation thereof, a valve for preventing the flow of fuel into said chamber while fuel flows from said chamber to said motor, a solenoid winding for operating said valve, means for conveying fuel from said chamber to a portion of said first mentioned means and then to said motor, a valve for preventing the flow of fuel through said last means during the flow of fuel through said second means to said chamber, a valve for preventing the flow of fuel from said tank, means for closing one of said last two valves and opening the other of said last two valves, said last means including a source of electric energy, and indicator means including a float in said chamber, a switch, a source of electric energy and an electro-responsive means.

4. In a fuel feed system for a motor, said system including a fuel tank, a fuel pump, a carburetor, and a main pipe line connection therebetween, the combination of a measuring chamber, a pipe for conducting fuel from said main pipe line to said chamber, said pipe connected to said chamber and to that portion of said main pipe line between said pump and said carburetor, a pipe for conducting fuel from said chamber to said main pipe line, said second pipe connected to said chamber and that portion of the main pipe line between said tank and pump, a closure valve in said first mentioned pipe, two valves in said second mentioned pipe, one of last mentioned two valves being in closed position while the other of said last mentioned two valves is in open position to prevent the flow of fuel from said tank to said motor while fuel flows from said chamber to said motor, means for operating all of said valves substantially simultaneously, said means including a source of electric energy, a switch and a float in said chamber.

5. In a fuel feed system for a motor, said system including a fuel tank, a fuel pump, a pipe line connection therebetween, a carburetor, a pipe line connection between said fuel pump and carburetor, means connecting said carburetor and motor, the combination of a test tank, a chamber, a connection between said second mentioned pipe line connection and said chamber for conducting fuel from said second mentioned pipe line connection to said chamber, a connection between said chamber and said test tank for conducting fuel from said chamber to said test tank, a valve for controlling the flow of fuel from said chamber to said test tank, a second chamber, said second chamber having three spaced openings, a portion of said first pipe line connection connected to said second chamber at one of said openings and to said fuel tank, a connection connected to said test tank and to said second chamber at another of said openings for conducting fuel from said test tank to said second chamber, the other portion of said first pipe line connection connected to said pump and said second chamber at its third opening, two valves in said second chamber for controlling the flow of fuel in said other portion of said first pipe line connection, one of said last two valves, when in closed position preventing the flow of fuel through one of said openings and into said second chamber from said fuel tank while fuel flows from said test tank through said second chamber to said pump, the other of said last two valves when in closed position preventing the flow of fuel through another of said openings, the third opening being open for fuel flow therethrough irrespective of the position of said last two valves and means for operating said valves.

6. In a fuel feed system for a motor, said system including a fuel tank and a feed pump, the combination of a measuring chamber, fuel conducting means connected to said chamber and the inlet side of said pump, a valve for controlling the flow of fuel into said chamber, fuel conducting means connected to said chamber and to the outlet side of said pump, a valve for controlling the flow of fuel out of said chamber, a valve for controlling the flow of fuel from said tank to said pump, means for operating said valves, said last means including liquid responsive means, a source of electric energy and solenoid windings.

FRANKLYN G. GOODE.
GUY R. HUMPHREY.